W. FODEN.
METALLIC PACKING FOR PISTON RODS AND THE LIKE.
APPLICATION FILED APR. 9, 1910.
998,165.
Patented July 18, 1911.
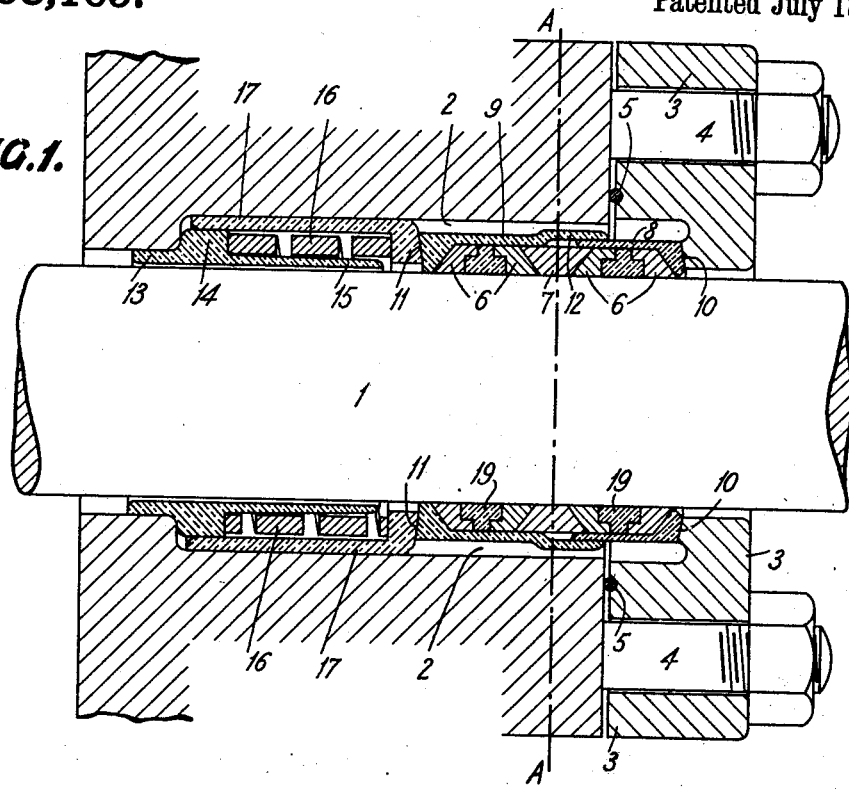
FIG. 1.
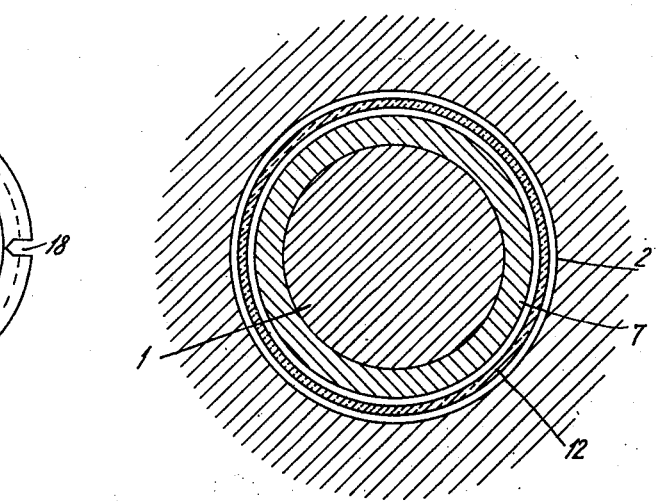
FIG. 3.
FIG. 2.
Attest:
Ewd L. Tolson
Edward N. Sarton
Inventor:
William Foden,
by Spear Middleton, Donaldson & Spear
Attys.

UNITED STATES PATENT OFFICE.

WILLIAM FODEN, OF LIVERPOOL, ENGLAND.

METALLIC PACKING FOR PISTON-RODS AND THE LIKE.

998,165.   Specification of Letters Patent.   Patented July 18, 1911.

Application filed April 9, 1910. Serial No. 554,522.

*To all whom it may concern:*

Be it known that I, WILLIAM FODEN, a subject of the King of Great Britain, and residing in Liverpool, in the county of Lancaster, England, have invented certain new and useful Improvements in Metallic Packing for Piston-Rods and the Like, of which the following is a specification.

This invention has reference to metallic packings for piston rods, valve spindles, pump rods and the like, of that type in which the packing is single-ended and is pressed against the rod by the action of a spring and also by the fluid pressure, and the object is to effect improvements in design so as to avoid risk of damage in event of the spring breaking and to more effectually prevent leakage around the back of the packing rings. I accordingly arrange the spring in an annular space in which it is practically inclosed and from which the parts could not escape in event of fracture, the parts being so arranged that while the spring pressure and the fluid pressure are transmitted axially to the packing, access of the fluid pressure to the back of the packing is prevented. I also make the wearing rings so that they have overlapping portions and inclose them in two sleeves one of which has an end of enlarged diameter which overlaps closely the end of the other sleeve.

In the accompanying drawings which show a packing of this type with my improvements embodied, Figure 1 is an elevation in axial section, Fig. 2 is a cross-section on the line A, A, of Fig. 1, and Fig. 3 is a view of one of the wearing rings 6, showing how they are cut.

1 is the rod, 2 is the stuffing box, and 3 is the gland or cover, secured to the stuffing box by the studs 4, the joint being made fluid-tight in the usual manner by the jointing ring 5.

The wearing rings are made in two sets separated by the usual reversely doubly coned ring 7. Each set of wearing rings consists of the end rings 6 and the intervening ring 19. The end rings 6 are each coned on one side to conform with the sleeves subsequently mentioned, and the intervening ring 19 is of tee section as shown, the rings 6 being recessed so as to overlap the shoulders of the tee.

One set of the wearing rings is housed in the sleeve 8 and the other in the sleeve 9. The sleeves are coned internally at one end to conform with the wearing rings 6, and their outer ends are preferably made portions of spherical surfaces struck from the center of the piston when at about mid-stroke. These spherical surfaces are accurately surfaced so that they make fluid-tight joint against the corresponding surfaces 10 and 11 of the gland and spring sleeve respectively, and as the sleeves 8 and 9 are smaller in diameter than the stuffing box, the arrangement is thus of the floating type, accommodating slight lateral movements of the rod.

For a purpose to be subsequently described, the end of the sleeve 9 is enlarged as shown at 12 and arranged to overlap the adjacent end of the sleeve 8, the surfaces being closely and accurately fitted so as to make a substantially fluid-tight joint.

13 is the neck bush which fits closely in the neck of the stuffing box, and has a collar 14 and a long spigot 15 which is interposed between the rod and the helical compression spring 16. The neck bush is made slightly clear of the rod so as to permit of the lateral movement previously referred to.

17 is the spring sleeve which fits externally closely in the stuffing box, and which also fits internally closely over the collar 14 of the neck bush. The spring sleeve is flanged inwardly at one end, one side of the flange forming the accurately surfaced spherical joint surface 11 previously mentioned, and the other side forming an abutment for the compression spring 16 which is located in the annular space between the spring sleeve and the spigot 15 of the neck bush.

The wearing rings 6 and 19 are cut as shown at 18 in Fig. 3, the number of cuts depending upon the size of the rod. The apex of each cut reaches nearly, but not quite, to the inside of the ring, so that the parts are not actually separated. In assembling the rings, the cuts are of course arranged so as to break joint as effectually as possible.

It will be seen that the axial pressure of the spring sleeve 17 forces the spherical surfaces 10 and 11 into close fluid-tight contact and also, by the action of the coned ends of the sleeves 8 and 9 and the doubly coned ring 7, it presses the wearing rings 6, as they wear, on to the rod. As the rings 6 both overlap the ring 19 the latter participates in the inward movement of the former. During the fluid pressure stroke, the action of the compressed spring 16 on the sleeve 17 is augmented by the fluid pressure, which has access to the inner face of the flange of the sleeve 17, and the tightness is relaxed during the return stroke.

In ordinary single ended packings the steam or other fluid has free access into the space in the stuffing box behind the packing and is only prevented from blowing out of the box by the joint corresponding to 10, which is thus exposed to the full steam pressure. In my arrangement on the other hand the steam cannot reach the joint at 10 without first passing the joint at 11, or else passing along between the spring sleeve 17 and the stuffing box; in order to do so it must first pass between the neck bush and the neck of the stuffing box or between the collar 14 and the inner surface of the spring sleeve, and as all these surfaces fit closely, any steam so passing would be small in quantity and much reduced in pressure, causing very little tendency to leak at the joint 10. The arrangement thus possesses the advantages of a double ended packing with the simplicity of a single ended packing.

The object of the close overlapping engagement of the packing sleeves 9 and 8, as shown at 12, is to prevent any steam which may leak into the space behind the packing sleeves from entering into either sleeve and then passing down to the rod through the cuts in the wearing rings. Should any steam leak into the sleeves, the overlapping parts of the rings 6 and 19 will offer additional resistance to leakage toward the rod.

It will be seen that the spring 16 being practically entirely inclosed in the annular space between the spigot 15 and the spring sleeve 17, should it be broken, the fragments will be prevented from escaping and so damaging the rod or the wearing rings or other parts of the arrangement.

Having now fully described my invention, I declare that what I claim and desire to secure by Letters Patent is:—

1. In combination; a stuffing box, a rod passing therethrough, a gland jointed fluid-tightly to the said box, a metallic packing inclosed in a pair of sleeves, the foremost of which abuts fluid-tightly against the gland, a spring sleeve fitting closely in the stuffing box, exposed internally to the fluid pressure and abutting fluid-tightly against the end of the rearmost packing sleeve, a neck bush fitting closely in the stuffing box, and a compression spring interposed between the neck bush and the spring sleeve; substantially as described.

2. In combination; a stuffing box, a rod passing therethrough, a gland jointed fluid-tightly to the said box, a metallic packing inclosed in a pair of sleeves the foremost of which abuts fluid-tightly against the gland, a neck bush fitting closely in the neck of the stuffing box and having an external collar and a spigot encircling the rod and projecting toward the packing, a spring sleeve fitting closely in the stuffing box and over the collar of the neck bush, and having an internal flange the outer side of which abuts fluid-tightly against the end of the rearmost packing sleeve, and a compression spring housed in the annular space between the spring sleeve and the spigot of the neck bush; substantially as described.

3. In combination; a stuffing box, a rod passing therethrough, a gland jointed fluid-tightly to the said box, a sleeve abutting fluid-tightly against the gland and containing one set of coned packing rings, a second sleeve containing another set of coned packing rings and having its end enlarged and overlapping fluid-tightly the end of the first sleeve, a coned ring between the sets of packing rings covered by the sleeves, a compression spring in rear of the second sleeve, and means for transmitting the axial pressure of said spring and of the fluid to the sleeves without permitting access of the fluid behind the sleeves; substantially as described.

4. In combination; a stuffing box, a rod passing therethrough, a gland jointed fluid-tightly to the said box, a sleeve abutting fluid-tightly against the gland and containing a set of packing rings consisting of a pair of rings each coned on one side and shouldered on the other and a ring of T section interposed and fitting between them so that their shoulders overlap, a second sleeve containing a similar set of packing rings and having its end enlarged and overlapping fluid-tightly the end of the first sleeve, a coned ring between the sets of packing rings covered by the sleeves, a compression spring in rear of the second sleeve, and means for transmitting the axial pressure of said spring and of the fluid to the sleeves without permitting access of the fluid behind the sleeves; substantially as described.

In testimony whereof I have hereunto set my hand in the presence of two subscribing witnesses.

WILLIAM FODEN.

Witnesses:
J. E. LLOYD BARNES,
JOSEPH E. HIRST.